(12) United States Patent
Cezanne et al.

(10) Patent No.: US 10,708,089 B2
(45) Date of Patent: Jul. 7, 2020

(54) METHOD FOR A UE FOR REQUESTING A CHANNEL STATE INFORMATION REFERENCE SIGNAL (CSI-RS) OR A SOUNDING REFERENCE SIGNAL (SRS)

(71) Applicant: QUALCOMM Incorporated, San Diego, CA (US)

(72) Inventors: Juergen Cezanne, Ocean Township, NJ (US); Ruhua He, San Diego, CA (US); Sundar Subramanian, San Diego, CA (US); Tao Luo, San Diego, CA (US); Muhammad Nazmul Islam, Littleton, MA (US); Junyi Li, Chester, NJ (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/192,524

(22) Filed: Nov. 15, 2018

(65) Prior Publication Data
US 2019/0158319 A1    May 23, 2019

Related U.S. Application Data

(60) Provisional application No. 62/588,273, filed on Nov. 17, 2017.

(51) Int. Cl.
*H04L 25/02* (2006.01)
*H04B 7/08* (2006.01)
(Continued)

(52) U.S. Cl.
CPC ....... *H04L 25/0228* (2013.01); *H04B 7/0456* (2013.01); *H04B 7/0623* (2013.01);
(Continued)

(58) Field of Classification Search
CPC ... H04L 25/0228; H04L 1/0003; H04L 5/005; H04L 5/006; H04B 17/27; H04B 17/309;
(Continued)

(56) References Cited

U.S. PATENT DOCUMENTS

| 2016/0006549 | A1* | 1/2016 | Kim | H04L 1/0026 370/252 |
|---|---|---|---|---|
| 2017/0215096 | A1 | 7/2017 | Moon et al. | |
| 2017/0311290 | A1* | 10/2017 | Adjakple | H04W 76/18 |

FOREIGN PATENT DOCUMENTS

WO    2017123079 A1    7/2017

OTHER PUBLICATIONS

International Search Report and Written Opinion—PCT/US2018/061605—ISA/EPO—dated Aug. 9, 2019.
(Continued)

*Primary Examiner* — Michael R Neff
(74) *Attorney, Agent, or Firm* — Loza & Loza, LLP

(57) ABSTRACT

Aspects of the disclosure relate to a method of operating a scheduled entity for wireless communication with a network. In some aspects, the scheduled entity transmits a message that requests a scheduling entity to transmit at least one reference signal. The scheduled entity obtains channel state information based on the at least one reference signal. The scheduled entity transmits a report that includes the channel state information. In other aspects, the scheduled entity transmits a message that requests a scheduling entity to schedule a reference signal transmission for the scheduled entity. The scheduled entity obtains an assignment of resources for transmission of the reference signal in response to the message. The scheduled entity transmits the reference signal based on the assignment of resources. Other aspects, embodiments, and features are also claimed and described.

16 Claims, 11 Drawing Sheets

(51) Int. Cl.
  *H04B 7/06*   (2006.01)
  *H04B 7/0456*  (2017.01)
  *H04B 17/27*  (2015.01)
  *H04B 17/309*  (2015.01)
  *H04B 17/382*  (2015.01)
  *H04L 1/00*   (2006.01)
  *H04L 5/00*   (2006.01)
  *H04B 7/0413*  (2017.01)

(52) U.S. Cl.
  CPC ......... *H04B 7/0639* (2013.01); *H04B 7/0695* (2013.01); *H04B 7/088* (2013.01); *H04B 17/27* (2015.01); *H04B 17/309* (2015.01); *H04B 17/382* (2015.01); *H04L 1/0003* (2013.01); *H04L 5/005* (2013.01); *H04L 5/006* (2013.01); *H04B 7/0413* (2013.01)

(58) Field of Classification Search
  CPC .. H04B 17/382; H04B 7/0639; H04B 7/0623; H04B 7/0695; H04B 7/088
  USPC ......................................................... 375/262
  See application file for complete search history.

(56) References Cited

OTHER PUBLICATIONS

Partial International Search Report—PCT/US2018/061605—ISA/EPO—dated Jun. 11, 2019.

* cited by examiner

METHOD FOR A UE FOR REQUESTING A CHANNEL STATE INFORMATION REFERENCE SIGNAL (CSI-RS) OR A SOUNDING REFERENCE SIGNAL (SRS)

PRIORITY CLAIM

This application claims priority to and the benefit of U.S. Provisional Application No. 62/588,273 filed in the U.S. Patent and Trademark Office on Nov. 17, 2017, the entire content of which is incorporated herein by reference as if fully set forth below in its entirety and for all applicable purposes.

TECHNICAL FIELD

The technology described herein relates generally to wireless communication systems, and more particularly, to a method for a user equipment (UE) for requesting a Channel State Information Reference Signal (CSI-RS) or a Sounding Reference Signal (SRS).

INTRODUCTION

In conventional wireless communication systems, such as millimeter wave (mmW) cellular systems, a user equipment (UE) and a base station (BS) may use beamforming to overcome high path-losses. In doing so, both the UE and the BS may find at least one adequate beam in order to form a link (also referred to as a beam pair link (BPL)). The UE and BS may monitor the quality of the BPL and may independently attempt to refine their respective beams to maintain or improve the quality of the BPL.

For example, in scenarios where the UE implements multiple-input multiple-output (MIMO) communications, the UE may also need to refine its MIMO communication parameters (e.g., modulation and coding scheme (MCS), precoding matrix, etc.) as part of its beam refinement procedure. Such refinement of MIMO communication parameters may require one or more signals from the BS. Conventional wireless communication systems, however, do not provide mechanisms that enable a UE to request the BS to transmit the one or more signals needed for refinement of MIMO communication parameters. As a result, the UE in the previously described scenarios may not be able to adequately perform the beam refinement procedures needed to maintain or improve the quality of the BPL.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication for a scheduled entity (e.g., a user equipment (UE)) is disclosed. The method includes transmitting a message that requests a scheduling entity (e.g., a base station (BS)) to transmit at least one reference signal, obtaining channel state information based on the at least one reference signal, and transmitting a report that includes the channel state information.

In one example, an apparatus for wireless communication is disclosed. The apparatus includes at least one processor, a transceiver communicatively coupled to the at least one processor, and a memory communicatively coupled to the at least one processor. The at least one processor is configured to transmit a message that requests a scheduling entity to transmit at least one reference signal, obtain channel state information based on the at least one reference signal, and transmit a report that includes the channel state information.

In one example, an apparatus for wireless communication is disclosed. The apparatus includes means for transmitting a message that requests a scheduling entity to transmit at least one reference signal, means for obtaining channel state information based on the at least one reference signal, and means for transmitting a report that includes the channel state information.

In one example, a non-transitory computer-readable medium storing computer-executable code is disclosed. The non-transitory computer-readable medium includes code for causing a computer to transmit, from a scheduled entity, a message that requests a scheduling entity to transmit at least one reference signal. The non-transitory computer-readable medium further includes code for causing the computer to obtain, at the scheduled entity, channel state information based on the at least one reference signal. The non-transitory computer-readable medium further includes code for causing the computer to transmit, from the scheduled entity, a report that includes the channel state information.

In one example, a method of wireless communication for a scheduled entity is disclosed. The method includes transmitting, from a scheduled entity, a message that requests a scheduling entity to schedule a reference signal transmission for the scheduled entity, obtaining, at the scheduled entity, an assignment of resources for transmission of the reference signal in response to the message, and transmitting, from the scheduled entity, the reference signal based on the assignment of resources.

In one example, an apparatus for wireless communication is disclosed. The apparatus includes at least one processor, a transceiver communicatively coupled to the at least one processor, and a memory communicatively coupled to the at least one processor. The at least one processor is configured to transmit a message that requests a scheduling entity to schedule a reference signal transmission for the scheduled entity, obtain an assignment of resources for transmission of the reference signal in response to the message, and transmit the reference signal based on the assignment of resources.

In one example, an apparatus for wireless communication is disclosed. The apparatus includes means for transmitting a message that requests a scheduling entity to schedule a reference signal transmission for the scheduled entity, means for obtaining an assignment of resources for transmission of the reference signal in response to the message, and means for transmitting the reference signal based on the assignment of resources.

In one example, a non-transitory computer-readable medium storing computer-executable code is disclosed. The non-transitory computer-readable medium includes code for causing a computer to transmit, from a scheduled entity, a message that requests a scheduling entity to schedule a reference signal transmission for the scheduled entity. The non-transitory computer-readable medium further includes code for causing the computer to obtain, at the scheduled entity, an assignment of resources for transmission of the reference signal in response to the message. The non-transitory computer-readable medium further includes code for causing the computer to transmit, from the scheduled entity, the reference signal based on the assignment of resources.

In one example, a method of wireless communication for a scheduling entity is disclosed. The method includes obtaining a message that requests the scheduling entity to transmit at least one reference signal, and transmitting the at least one reference signal to a scheduled entity in response to the message.

In one example, an apparatus for wireless communication is disclosed. The apparatus includes at least one processor, a transceiver communicatively coupled to the at least one processor, and a memory communicatively coupled to the at least one processor. The at least one processor is configured to obtain a message that requests the scheduling entity to transmit at least one reference signal, and transmit the at least one reference signal to a scheduled entity in response to the message.

In one example, an apparatus for wireless communication is disclosed. The apparatus includes means for obtaining a message that requests the scheduling entity to transmit at least one reference signal, and means for transmitting the at least one reference signal to a scheduled entity in response to the message.

In one example, a non-transitory computer-readable medium storing computer-executable code is disclosed. The non-transitory computer-readable medium includes code for causing a computer to obtain, at a scheduling entity, a message that requests the scheduling entity to transmit at least one reference signal. The non-transitory computer-readable medium further includes code for causing the computer to transmit, from the scheduling entity, the at least one reference signal to a scheduled entity in response to the message.

In one example, a method of wireless communication for a scheduling entity is disclosed. The method includes obtaining a message that requests the scheduling entity to schedule a reference signal transmission for a scheduled entity, transmitting, from the scheduling entity, a first assignment of resources to the scheduled entity for transmission of the reference signal in response to the message, and obtaining at least one reference signal from the scheduled entity.

In one example, an apparatus for wireless communication is disclosed. The apparatus includes at least one processor, a transceiver communicatively coupled to the at least one processor, and a memory communicatively coupled to the at least one processor. The at least one processor is configured to obtain a message that requests the scheduling entity to schedule a reference signal transmission for a scheduled entity, transmit a first assignment of resources to the scheduled entity for transmission of the reference signal in response to the message, and obtain at least one reference signal from the scheduled entity.

In one example, an apparatus for wireless communication is disclosed. The apparatus includes means for obtaining a message that requests the scheduling entity to schedule a reference signal transmission for a scheduled entity, means for transmitting a first assignment of resources to the scheduled entity for transmission of the reference signal in response to the message, and means for obtaining at least one reference signal from the scheduled entity.

In one example, a non-transitory computer-readable medium storing computer-executable code is disclosed. The non-transitory computer-readable medium includes code for causing a computer to obtain, at a scheduling entity, a message that requests the scheduling entity to schedule a reference signal transmission for a scheduled entity. The non-transitory computer-readable medium further includes code for causing the computer to transmit, from the scheduling entity, a first assignment of resources to the scheduled entity for transmission of the reference signal in response to the message. The non-transitory computer-readable medium further includes code for causing the computer to obtain, at the scheduling entity, at least one reference signal from the scheduled entity.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
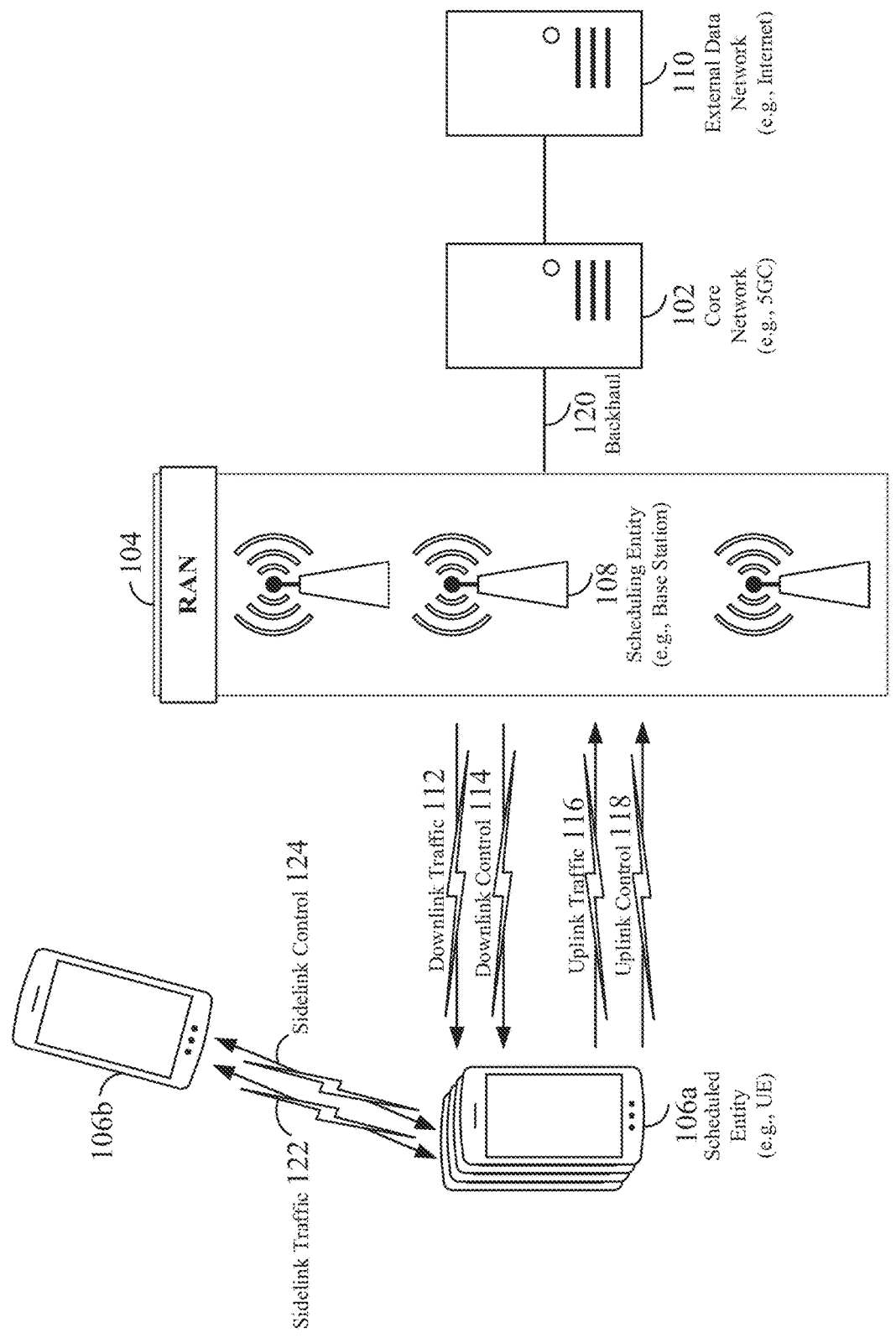
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The term beamforming may generally refer to a directional signal transmission or reception. For a beamformed transmission, the amplitude and phase of each antenna in an array of antennas may be precoded, or controlled to create a desired (i.e., directional) pattern of constructive and destructive interference in the wavefront.

The term multiple-input multiple-output (MIMO) may generally refer to a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another. In single-user MIMO, the transmitter sends one or more streams to the same receiver, taking advantage of capacity gains associated with using multiple Tx, Rx antennas in rich scattering environments where channel variations can be tracked. The receiver may track these channel variations and provide corresponding feedback to the transmitter. This feedback may include channel quality information (CQI), the number of preferred data streams (e.g., rate control, a rank indicator (RI)), and a precoding matrix index (PMI).

The term massive MIMO may generally refer to a MIMO system with a very large number of antennas (e.g., greater than an 8×8 array).

The term MU-MIMO may generally refer to a multi-antenna technology where a base station, in communication with a large number of UEs, can exploit multipath signal propagation to increase overall network capacity by increasing throughput and spectral efficiency, and reducing the required transmission energy. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106 (e.g., including UE 106a, 106b in FIG. 1). By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In some examples, the UEs such as a first UE 106a and a second UE 106b may utilize sidelink signals for direct D2D communication. Sidelink signals may include sidelink traffic 122 and sidelink control 124. The sidelink control 124 may in some examples include a request signal, such as a request-to-send (RTS), a source transmit signal (STS), and/or a direction selection signal (DSS). The request signal may provide for the UE 106 to request a duration of time to keep a sidelink channel available for a sidelink signal. The sidelink control 124 may further include a response signal, such as a clear-to-send (CTS) and/or a destination receive signal (DRS). The response signal may provide for the UE 106 to indicate the availability of the sidelink channel, e.g., for a requested duration of time. An exchange of request and response signals (e.g., handshake) may enable different UEs performing sidelink communications to negotiate the availability of the sidelink channel prior to communication of the sidelink traffic 122.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
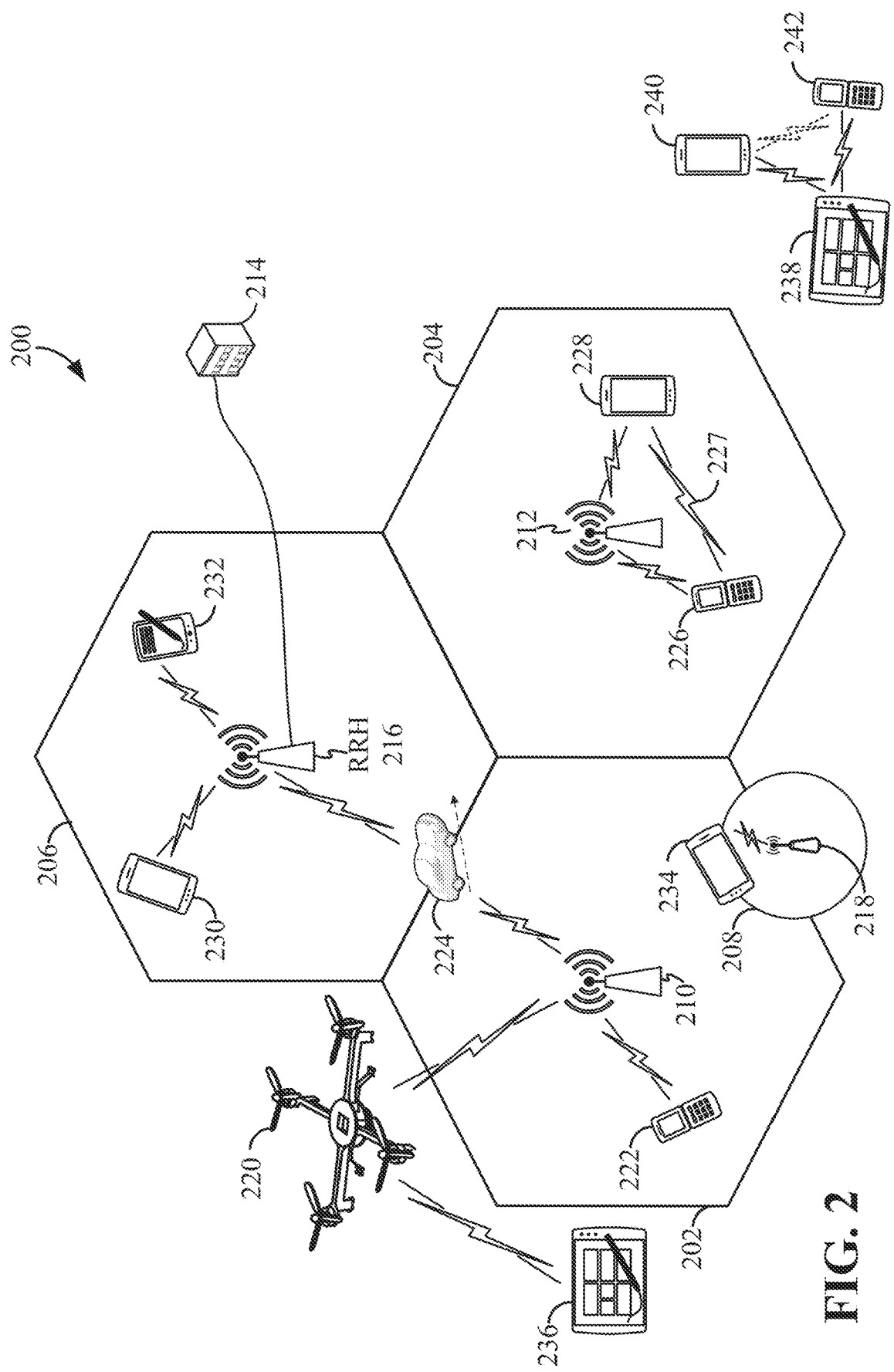
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
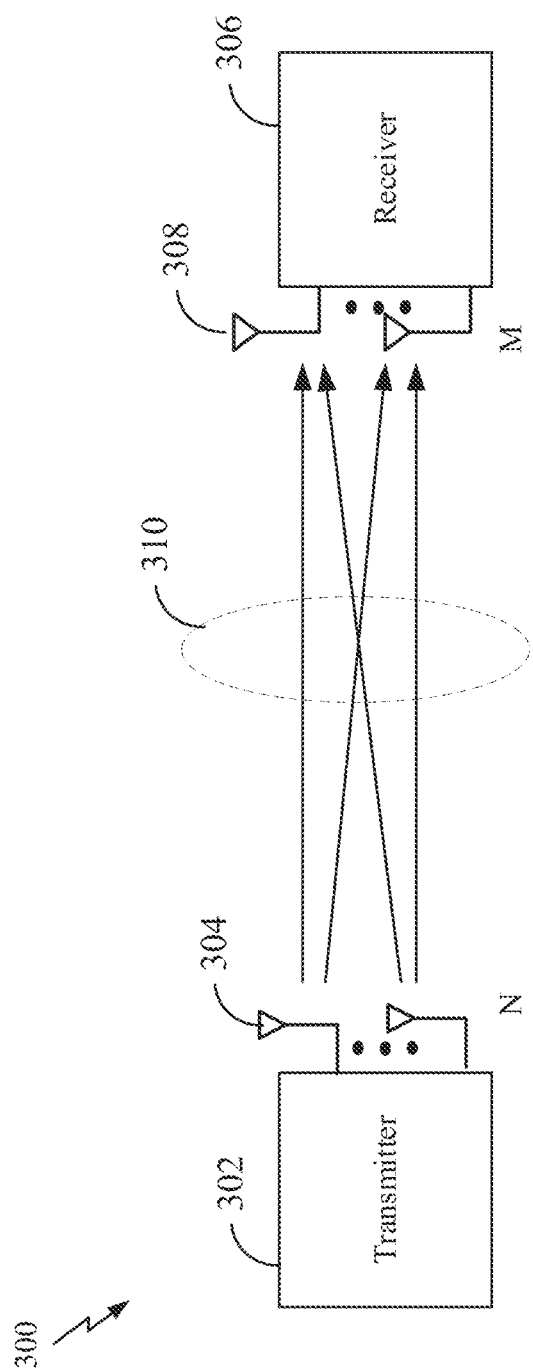
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC- FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
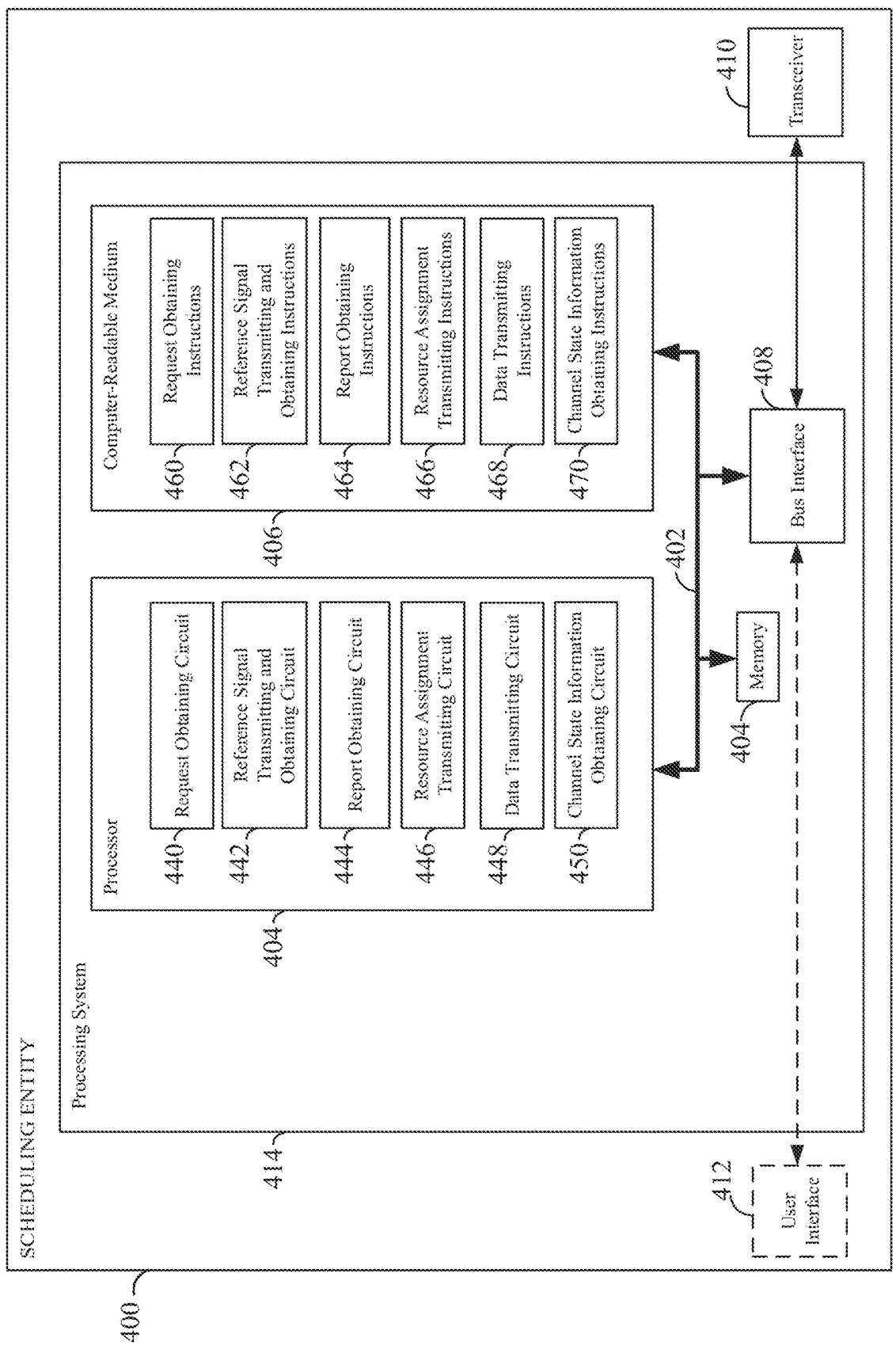
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity may be a base station as illustrated in any one or more of FIGS. 1, 2, and/or 3.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIGS. 10 and/or 11.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided.

In some aspects of the disclosure, the processor 404 may include a request obtaining circuit 440 configured for various functions, including, for example, obtaining a message that requests the scheduling entity to transmit at least one reference signal and/or obtaining a message that requests the scheduling entity to schedule a reference signal transmission for a scheduled entity. For example, the request obtaining circuit 440 may be configured to implement one or more of the functions described below in relation to FIGS. 10 and/or 11, including, e.g., blocks 1002, 1102.

In some aspects of the disclosure, the processor 404 may include a reference signal transmitting and obtaining circuit 442 configured for various functions, including, for example, transmitting at least one reference signal to a scheduled entity in response to the message and/or obtaining at least one reference signal from the scheduled entity. For example, the reference signal transmitting and obtaining circuit 442 may be configured to implement one or more of the functions described below in relation to FIGS. 10 and/or 11, including, e.g., blocks 1004, 1106.

In some aspects of the disclosure, the processor 404 may include a report obtaining circuit 444 configured for various functions, including, for example, obtaining a report including channel state information from the scheduled entity, wherein the channel state information is based on at least one reference signal. For example, the report obtaining circuit 444 may be configured to implement one or more of the functions described below in relation to FIG. 10, including, e.g., block 1006.

In some aspects of the disclosure, the processor 404 may include a resource assignment transmitting circuit 446 configured for various functions, including, for example, transmitting a first assignment of resources to the scheduled entity for transmission of the reference signal in response to the message and/or transmitting, from the scheduling entity, a second assignment of resources to the scheduled entity for an uplink data transmission in a MIMO transmission mode, wherein the resources are assigned based on the channel state information. For example, the resource assignment transmitting circuit 446 may be configured to implement one or more of the functions described below in relation to FIG. 11, including, e.g., blocks 1104 and/or 1110.

In some aspects of the disclosure, the processor 404 may include a data transmitting circuit 448 configured for various functions, including, for example, transmitting data based on at least the channel state information. For example, the data transmitting circuit 448 may be configured to implement one or more of the functions described below in relation to FIG. 10, including, e.g., block 1008.

In some aspects of the disclosure, the processor 404 may include a channel state information obtaining circuit 450 configured for various functions, including, for example, obtaining channel state information based on the at least one reference signal from the scheduled entity. For example, the channel state information obtaining circuit 450 may be configured to implement one or more of the functions described below in relation to FIG. 11, including, e.g., block 1108.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include request obtaining software 460 configured for various functions, including, for example, obtaining a message that requests the scheduling entity to transmit at least one reference signal and/or obtaining a message that requests the scheduling entity to schedule a reference signal transmission for a scheduled entity. For example, the request obtaining software 460 may be configured to implement one or more of the functions described above in relation to FIGS. 10 and/or 11, including, e.g., blocks 1002, 1102.

In one or more examples, the computer-readable storage medium 406 may include reference signal transmitting and obtaining software 462 configured for various functions, including, for example, transmitting at least one reference signal to a scheduled entity in response to the message and/or obtaining at least one reference signal from the scheduled entity. For example, the reference signal transmitting and obtaining software 462 may be configured to implement one or more of the functions described above in relation to FIGS. 10 and/or 11, including, e.g., blocks 1004, 1106.

In one or more examples, the computer-readable storage medium 406 may include report obtaining software 464 configured for various functions, including, for example, obtaining a report including channel state information from the scheduled entity, wherein the channel state information is based on at least one reference signal. For example, the report obtaining software 464 may be configured to implement one or more of the functions described above in relation to FIG. 10, including, e.g., block 1006.

In one or more examples, the computer-readable storage medium 406 may include resource assignment transmitting software 466 configured for various functions, including, for example, transmitting a first assignment of resources to the scheduled entity for transmission of the reference signal in response to the message and/or transmitting, from the scheduling entity, a second assignment of resources to the scheduled entity for an uplink data transmission in a MIMO transmission mode, wherein the resources are assigned based on the channel state information. For example, the resource assignment transmitting software 466 may be configured to implement one or more of the functions described above in relation to FIG. 11, including, e.g., blocks 1104 and/or 1110.

In one or more examples, the computer-readable storage medium 406 may include data transmitting software 468 configured for various functions, including, for example, transmitting data based on at least the channel state information. For example, the data transmitting software 468 may be configured to implement one or more of the functions described above in relation to FIG. 10, including, e.g., block 1008.

In one or more examples, the computer-readable storage medium 406 may include channel state information obtaining software 470 configured for various functions, including, for example, obtaining channel state information based on the at least one reference signal from the scheduled entity. For example, the channel state information obtaining software 470 may be configured to implement one or more of the functions described above in relation to FIG. 11, including, e.g., block 1108.

Figure 5:
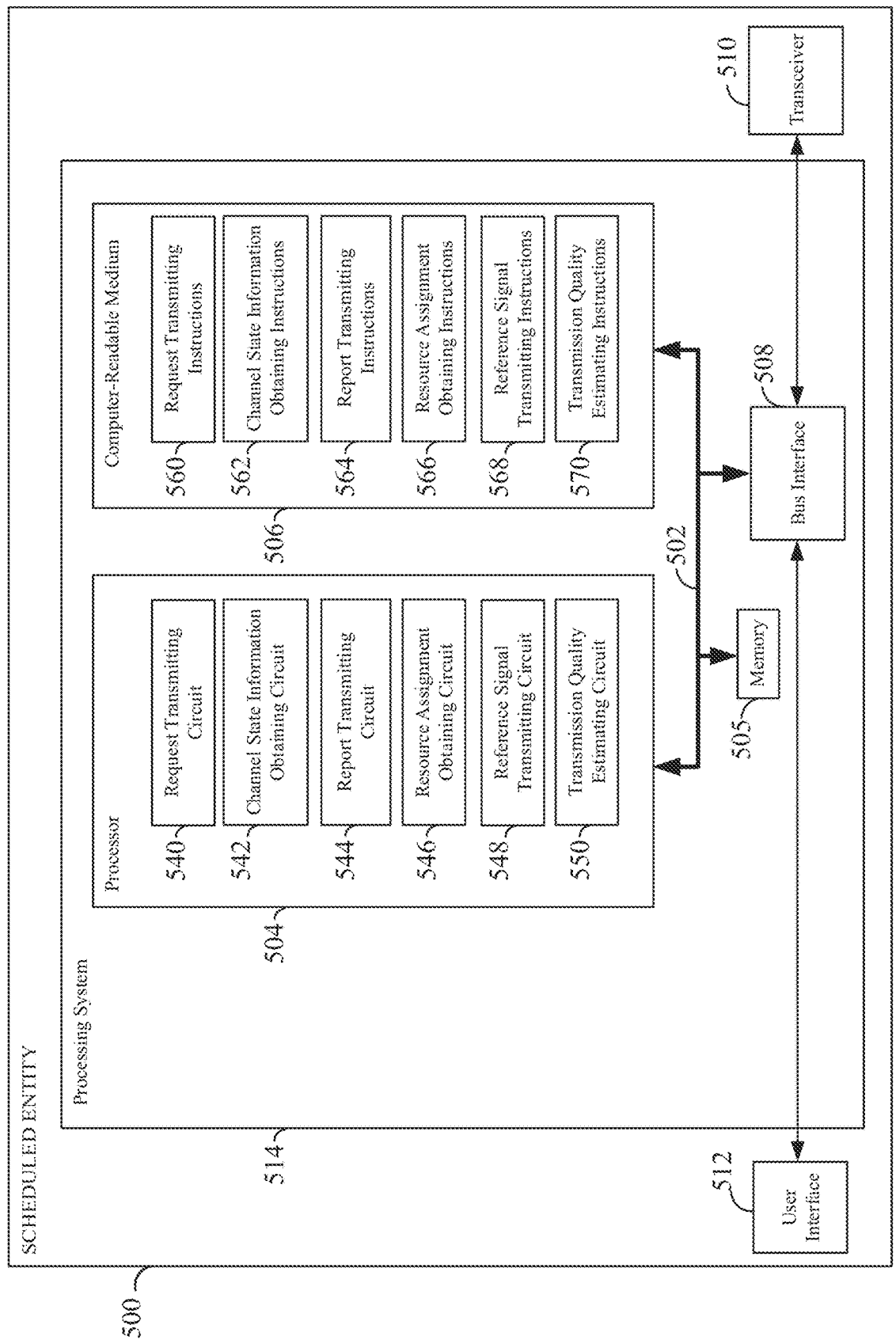
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, and/or 3.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described below and illustrated in FIGS. 8 and/or 9.

In some aspects of the disclosure, the processor 504 may include a request transmitting circuit 540 configured for various functions, including, for example, transmitting a message that requests a scheduling entity to transmit at least one reference signal and/or transmitting a message that requests a scheduling entity to schedule a reference signal transmission for the scheduled entity. For example, the request transmitting circuit 540 may be configured to implement one or more of the functions described below in relation to FIGS. 8 and/or 9, including, e.g., blocks 804, 904.

In some aspects of the disclosure, the processor 504 may include a channel state information obtaining circuit 542 configured for various functions, including, for example, obtaining channel state information based on the at least one reference signal. For example, the channel state information obtaining circuit 542 may be configured to implement one or more of the functions described below in relation to FIG. 8, including, e.g., block 806.

In some aspects of the disclosure, the processor 506 may include a report transmitting circuit 544 configured for various functions, including, for example, transmitting a report that includes the channel state information. For example, the report transmitting circuit 544 may be configured to implement one or more of the functions described below in relation to FIG. 8, including, e.g., block 808.

In some aspects of the disclosure, the processor 506 may include a resource assignment obtaining circuit 546 configured for various functions, including, for example, obtaining an assignment of resources for transmission of the reference signal in response to the message. For example, the resource assignment obtaining circuit 546 may be configured to implement one or more of the functions described below in relation to FIG. 9, including, e.g., block 906.

In some aspects of the disclosure, the processor 506 may include a reference signal transmitting circuit 548 configured for various functions, including, for example, transmitting the reference signal based on the assignment of resources. For example, the reference signal transmitting circuit 548 may be configured to implement one or more of the functions described below in relation to FIG. 9, including, e.g., block 908.

In some aspects of the disclosure, the processor 506 may include a transmission quality estimating circuit 550 configured for various functions, including, for example, estimating an amount of improvement in a quality of a downlink data transmission to be gained from the transmission of the reference signal, wherein the estimated amount of improvement is included in the message. In some examples, the transmission quality estimating circuit 550 may be further configured for various functions, including, for example, estimating an amount of improvement in a quality of an uplink data transmission to be gained from the transmission of the reference signal, wherein the estimated amount of improvement is included in the message. For example, the transmission quality estimating circuit 550 may be configured to implement one or more of the functions described below in relation to FIGS. 8 and/or 9, including, e.g., blocks 802, 902.

In one or more examples, the computer-readable storage medium 506 may include request transmitting software 560 configured for various functions, including, for example, transmitting a message that requests a scheduling entity to transmit at least one reference signal and/or transmitting a message that requests a scheduling entity to schedule a reference signal transmission for the scheduled entity. For example, the request transmitting software 560 may be configured to implement one or more of the functions described above in relation to FIGS. 8 and/or 9, including, e.g., blocks 804, 904.

In one or more examples, the computer-readable storage medium 506 may include channel state information obtaining software 562 configured for various functions, including, for example, obtaining channel state information based on the at least one reference signal. For example, the channel state information obtaining software 562 may be configured to implement one or more of the functions described above in relation to FIG. 8, including, e.g., block 806.

In one or more examples, the computer-readable storage medium 506 may include report transmitting software 564 configured for various functions, including, for example, transmitting a report that includes the channel state information. For example, the report transmitting software 564 may be configured to implement one or more of the functions described above in relation to FIG. 8, including, e.g., block 808.

In one or more examples, the computer-readable storage medium 506 may include resource assignment obtaining software 566 configured for various functions, including, for example, obtaining an assignment of resources for transmission of the reference signal in response to the message. For example, the resource assignment obtaining software 566 may be configured to implement one or more of the functions described above in relation to FIG. 9, including, e.g., block 906.

In one or more examples, the computer-readable storage medium 506 may include reference signal transmitting software 568 configured for various functions, including, for example, transmitting the reference signal based on the assignment of resources. For example, the reference signal transmitting software 568 may be configured to implement one or more of the functions described above in relation to FIG. 9, including, e.g., block 908.

In one or more examples, the computer-readable storage medium 506 may include transmission quality estimating software 570 configured for various functions, including, for example, estimating an amount of improvement in a quality of a downlink data transmission to be gained from the transmission of the reference signal, wherein the estimated amount of improvement is included in the message. In some examples, the transmission quality estimating software 570 may be further configured for various functions, including, for example, estimating an amount of improvement in a quality of an uplink data transmission to be gained from the transmission of the reference signal, wherein the estimated amount of improvement is included in the message. For example, the transmission quality estimating software 570 may be configured to implement one or more of the functions described above in relation to FIGS. 8 and/or 9, including, e.g., blocks 802, 902.

Downlink Communications

In millimeter wave (mmW) cellular systems, beamforming may be used to overcome high path-losses. To utilize beamforming, both a base station and a UE may find at least one adequate beam in order to form a link. A beam formed by the base station and a corresponding beam formed by the UE may form what is known as a beam pair link (BPL). The performance of the beam pair link may be subject to fading due to Doppler spread or blocking of the signal transmission path. In conventional systems, a base station and a UE typically work with pools of one or more beam pair links for the transmission of data and control messages in the downlink and the uplink. The UE and the base station may monitor the quality of a beam pair link and may carry out adjustments, such as beam refinements at the UE and beam refinements at the base station. In some scenarios, the UE may also have to switch between antenna subarrays. For example, if the UE is moved, its orientation is changed, or an antenna subarray being used is blocked by a body part of the user or an object, the UE may switch to a different antenna subarray.

In downlink communications, data may be transferred from a base station to a UE using MIMO transmissions as previously discussed with reference to FIG. 3. For example, MIMO transmissions may enable multiplexing or diversity gains. Prior to transmitting data on the downlink using MIMO transmissions, the base station may transmit a channel state information reference signal (CSI-RS) to the UE using antenna ports associated with one or more beams and/or multiple polarizations. The CSI-RS may enable the UE to acquire the channel and to measure the channel. For example, in 5G wireless communication network, the CSI-RS may be referred to as a CSI-RS for channel acquisition. The UE may receive the CSI-RS and may determine channel state information (CSI). For example, the CSI may include the modulation and coding scheme (MCS), rank indication (RI), and/or precoding matrix indication (PMI) for a MIMO transmission. The UE may report the CSI to the base station, which may use the CSI to adjust the parameters for its MIMO data transmission. The CSI values may depend on the phase and amplitude relationships between the channels of antenna ports associated with one or more beams and/or polarizations. For example, these relationships may change due to certain events or conditions, such as: (a) channel fading and time varying degrees of channel blockage; and/or (b) UE activities (e.g., UE beam refinement or switching of UE antenna subarrays). The UE may detect channel fading or variations in channel blocking from the reception of periodic downlink reference signals (RSs), such as synchronization signal blocks (SSB) or periodic CSI-RSs for beam management. The UE may also use these signals for refinement of the beams of the UE, and to determine whether to switch to a different antenna subarray. The UE may be configured to conduct these actions without any trigger or further support from the base station.

If the previously described events and/or conditions (e.g., (a) and/or (b)) occur with respect to at least one beam of a beam pair link that is included in a pool of beam pair links for data transmission, a new CSI-RS should follow such events and/or conditions to enable adjustment of MIMO transmission parameters. If a new CSI-RS does not follow such events and/or conditions, a UE may not be able to reap the benefit of a beam refinement operation or a subarray switching operation performed by the UE. Moreover, any MIMO transmissions from the UE subsequent to the events and/or conditions may operate at a suboptimal level or may even fail.

In conventional systems, the base station cannot detect when the previously described events and/or conditions (e.g., (a) and/or (b)) occur. Furthermore, in current NR specifications, the base station may either transmit a CSI-RS for channel acquisition after several failed MIMO transmissions or the scheduling entity may schedule frequent CSI-RS transmissions. Both of these alternatives for the base station are inefficient.

Uplink Communications

Situations similar to those discussed above with respect to downlink data transmissions may also occur for uplink data transmissions. According to the reciprocity theorem, the pathloss of a beam pair link is the same regardless of whether it is used for uplink data transmissions or downlink data transmissions. Therefore, useful beam pair links that have already been discovered for the downlink may be implemented for the uplink. Accordingly, in one example, a base station may obtain a beam pair link (BPL) to be used for an uplink data transmission by referring to a downlink reference signal (RS). For example, the same beam pair link that was previously used by the base station to transmit a downlink reference signal (RS) may be used by the base station to receive uplink data transmissions. This is possible because, for a selected beam pair link, signals in uplink data transmissions from a UE may propagate along similar paths (but in a reverse direction) as signals in downlink data transmissions from a base station. For example, to receive an uplink data transmission, the base station may use a reception beam (also referred to as an Rx-beam) that has the same directivity pattern as a transmission beam (also referred to as an Tx-beam) previously used by the base station to transmit a downlink RS. Likewise, the UE may have already determined a reception beam suitable to receive the downlink RS from the base station. Accordingly, for an uplink data transmission, the UE may form a transmission beam that has the same (or similar) directivity pattern as the reception beam. Therefore, in accordance with the previously described reciprocity theorem, an improvement of the downlink through a reception beam refinement performed by a UE, or a reception antenna subarray switching performed by the UE, may automatically translate to the uplink if the UE refines its transmission beam or switches its transmission subarray accordingly. Also, any channel fading and/or channel blocking discovered in the downlink may affect the uplink in the same manner. Thus, channel fading and/or channel blocking in the downlink, reception beam refinements performed by the UE, or antenna subarray switching operations performed by the UE will also affect the MIMO uplink data transmission.

For an uplink MIMO transmission, the base station may schedule the UE to transmit a Sounding Reference Signal (SRS) to enable the base station to obtain the parameters (modulation and coding scheme (MCS), number of layers, precoding matrix) for the uplink MIMO transmission. Therefore, the occurrence of events and/or conditions, such as channel fading, channel blocking, beam refinement operations performed by the UE, and/or antenna subarray switching operations performed by the UE, should be followed by a transmission of an SRS from the UE if the affected beam pair link is included in the pool of beam pair links for an uplink data transmission. If an SRS from the UE does not follow such events and/or conditions, a UE may not reap the benefit of a beam refinement operation or antenna subarray switching operation performed by the UE. Moreover, any MIMO transmissions from the UE subsequent to the events and/or conditions may operate at a suboptimal level or may even fail.

As explained herein, in conventional systems, a base station cannot detect when the previously described events and/or conditions (e.g., (a) and/or (b)) occur. Furthermore, in current NR specifications, a base station may either schedule a UE to transmit an SRS after several failed uplink MIMO transmissions or the base station may schedule frequent SRS transmissions. Both of these alternatives for the base station are inefficient.

Requests From a Scheduled Entity for Reference Signal Transmissions

In an aspect of the disclosure, a scheduled entity (e.g., scheduled entity 500) may determine whether a CSI-RS transmission (e.g., for channel acquisition) from the scheduling entity (e.g., scheduling entity 400) is needed, or whether an SRS transmission (e.g., for channel acquisition) from the scheduled entity is needed, based on one or more events and/or conditions. For example, the scheduled entity may make the determination as to whether a CSI-RS transmission or an SRS transmission is needed based on one or more events and/or conditions, such as: (1) measurements obtained by the scheduled entity; (2) any beam refinement operations performed by the scheduled entity; and/or (3) any antenna subarray switching operations performed by the scheduled entity. If the scheduled entity determines that a CSI-RS transmission or an SRS transmission is needed, the scheduled entity may transmit a request for the CSI-RS transmission or the SRS transmission to the scheduling entity. In an aspect of the disclosure, the scheduled entity may transmit the request for the CSI-RS transmission or the SRS transmission if one or more beams of the scheduled entity involved in the one or more events and/or conditions (e.g., events and/or conditions (1), (2) and/or (3)) are included in the pool of scheduled entity beams for downlink or uplink data transmission, respectively.

In an aspect of the disclosure, the request for transmission of a reference signal (e.g., CSI-RS or SRS) transmitted from the scheduled entity may include an indication of the beam pair link(s) associated with the scheduled entity beams involved in in the one or more events and/or conditions (e.g., events and/or conditions (1), (2) and/or (3)). Such indication of the beam pair link(s) may be achieved by transmitting a spatial quasi co-location (QCL) indication. If the pool of QCL indications for data transmission consists of only one element, the QCL indication may not be needed. For example, the spatial QCL indication may enable the scheduling entity to transmit a CSI-RS that is beamformed in a direction of the beam pair link indicated in the spatial QCL indication. As another example, the spatial QCL indication may enable the scheduling entity to schedule an SRS transmission from the scheduled entity according to the spatial QCL indication, such that the scheduled entity transmits an SRS that is beamformed in a direction of the beam pair link indicated in the spatial QCL indication.

In some aspects of the disclosure, the request transmitted from the scheduled entity (e.g., scheduled entity 500) may further include a quality metric that enables the scheduling entity to determine whether to transmit a CSI-RS or schedule a transmission of an SRS. For example, the quality metric may estimate the amount of improvement that can be expected from the transmission of CSI-RS or SRS, and the following recalculation of the MIMO transmission parameters. For example, the amount of improvement may be indicated as a pathloss improvement with respect to a channel and may be expressed in decibels (dB). Accordingly, in such example, the scheduling entity may determine to transmit a CSI-RS (or schedule transmission of an SRS) if the amount of improvement (e.g., quality metric) exceeds a threshold. Therefore, the scheduled entity may be configured to use this metric to determine whether the CSI-RS or SRS transmission is worthwhile given any buffered data traffic. In some aspects of the disclosure, the scheduled entity may transmit the request in a message on a physical uplink shared channel (PUSCH) or a physical uplink control channel (PUCCH), or may transmit the request as part of a downlink beam report.

Figure 6:
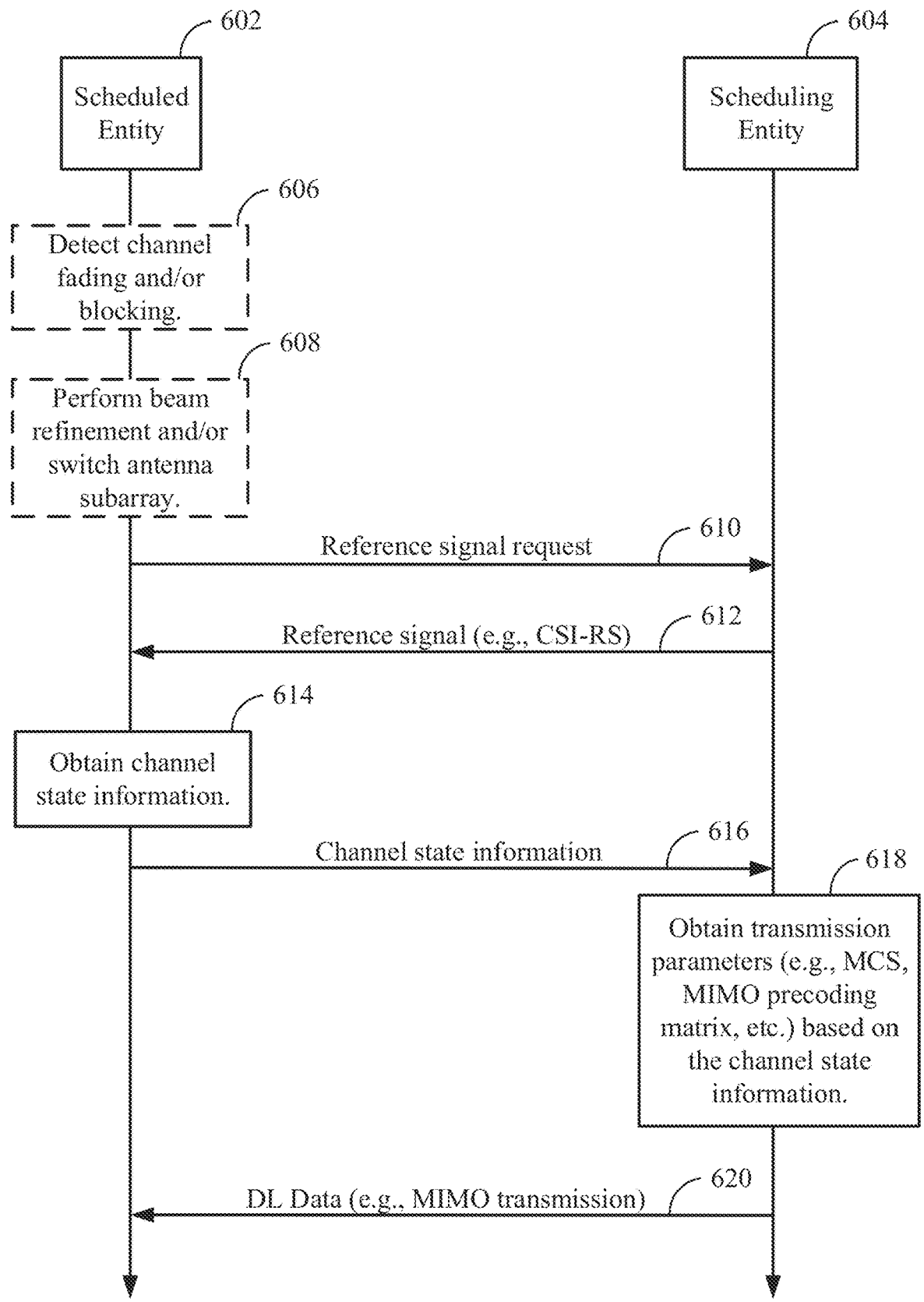
FIG. 6 is a signal flow diagram according to some aspects of the disclosure.

FIG. 6 is a signal flow diagram in accordance with some aspects of the disclosure. It should be understood that the operations shown with dashed lines in FIG. 6 represent optional operations. FIG. 6 includes a scheduled entity 602 and a scheduling entity 604. For example, the scheduled entity 602 may correspond to the scheduled entity 500 in FIG. 5 and the scheduling entity 604 may correspond to the scheduling entity 400 in FIG. 4.

As shown in FIG. 6, the scheduled entity 602 may detect channel fading and/or channel blocking 606. As further shown in FIG. 6, the scheduled entity 602 may perform a beam refinement operation and/or may switch an antenna subarray 608. The scheduled entity 602 may transmit a message 610 that includes a reference signal request. In some aspects, the scheduled entity 602 may transmit the message 610 in response to performing operation 606 and/or 608.

The scheduling entity 604 may transmit a reference signal 612 (e.g., a CSI-RS) in response to the reference signal request. The scheduled entity 602 may obtain channel state information 614 using the reference signal 612 and may transmit a report 616 that includes the channel state information. The scheduling entity 604 may obtain transmission parameters 618 (e.g., MCS, MIMO precoding matrix, etc.) based on the channel state information. The scheduling entity 604 may then transmit downlink (DL) data 620 using a MIMO transmission based on the transmission parameters.

In one example, the reference signal request in the message 610 may include a request for a CSI-RS with a QCL indication Q. The scheduling entity 604 may transmit a reference signal 612 (e.g., a CSI-RS) with a beam compatible with the QCL indication Q. The scheduled entity 602 may refine (e.g., improve) its receive beam and may measure a receive power, such as a reference signal received power (RSRP) (also referred to as a physical layer RSRP or a Layer 1 RSRP (L1-RSRP)), using the refined receive beam. Since the scheduled entity 602 may measure the receive power using the refined receive beam, the scheduled entity 602 may measure a more accurate (e.g., a higher RSRP) receive power. The scheduled entity 602 may include the more accurate receive power (e.g., RSRP) in the report 616. The scheduled entity 602 may use the refined receive beam whenever the scheduling entity 604 transmits a DL channel or signal (e.g., DL data 620) with the QCL indication Q. In this example, it should be noted that the scheduled entity 602 may not explicitly indicate the refined receive beam in the report 616. In some aspects of the disclosure, the scheduled entity 602 may apply the results of its measurements to future downlink transmissions from the scheduling entity 604. In some aspects of the disclosure, the scheduling entity 604 may use the more accurate receive power in the report 616 to adjust its transmit power for future downlink data transmissions with the QCL indication Q.

In another example, the scheduling entity 604 may transmit the reference signal 612 (e.g., CSI-RS) with different beams in different symbols. These different beams may have different QCL indications. The scheduled entity 602 may measure the different beams and may determine the best beam (e.g., the beam with the highest receive power) based on the measurements. The scheduled entity 602 may indicate the best beam and the best (e.g., highest) receive power in the report 616. In some aspects of the disclosure, the scheduled entity 602 may optimize its receive beam. The scheduling entity 604 may proceed to use the best beam indicated in the report 616 and the scheduled entity 602 may use its matching best beam when receiving future downlink transmissions from the scheduling entity 604. In this example, the scheduling entity 604 may transmit the previously described different beams (e.g., CSI-RS) as part of a beam sweep. In other examples, the scheduled entity 602 may estimate the amount of improvement (e.g., the amount of increase in the RSRP) and may include the amount of improvement in the message 610. In these examples, the scheduling entity 604 may transmit the reference signal 612 (e.g., CSI-RS) with a constant (non-sweeping) beam.

Figure 7:
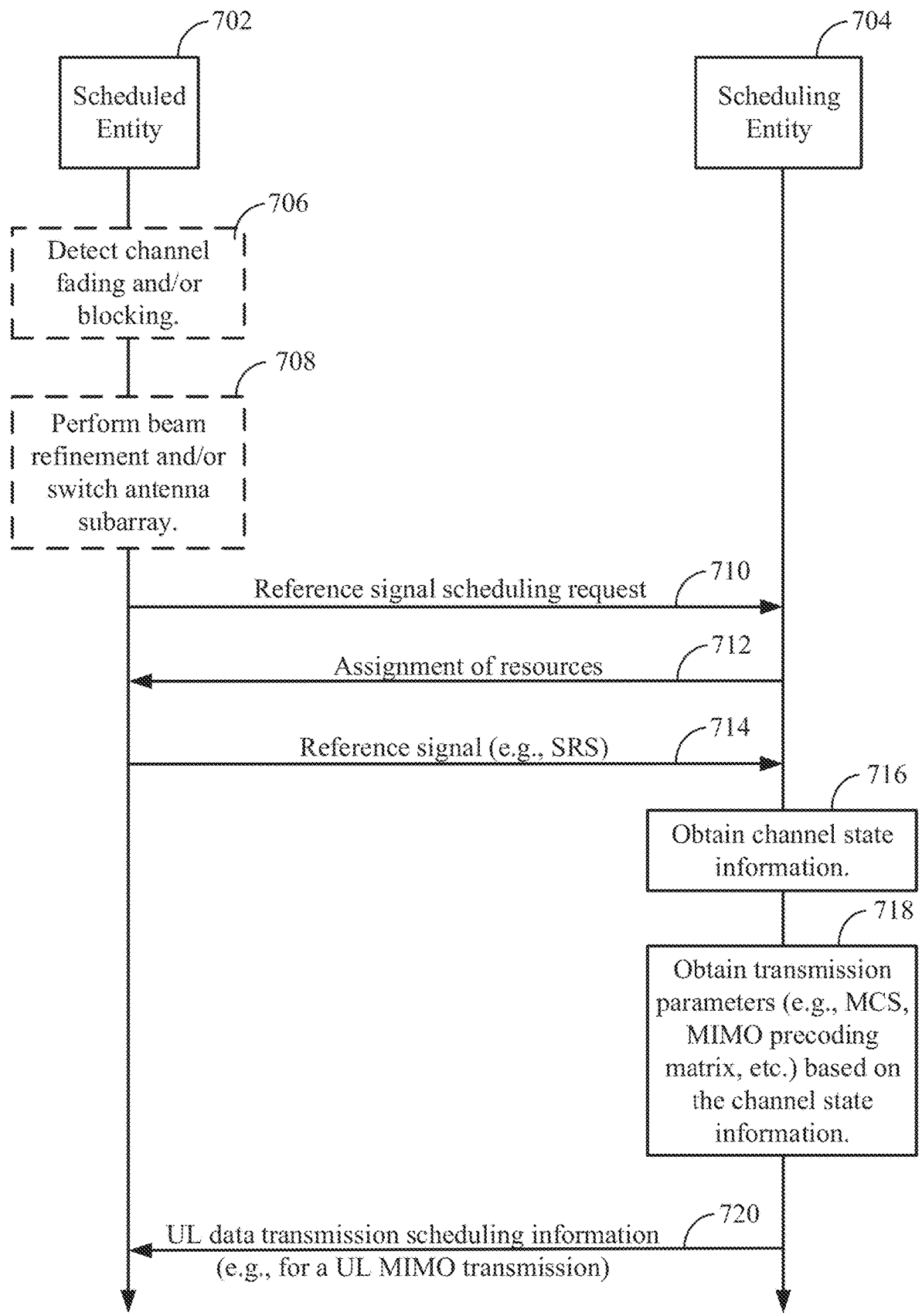
FIG. 7 is a signal flow diagram according to some aspects of the disclosure.

FIG. 7 is a signal flow diagram in accordance with some aspects of the disclosure. It should be understood that the operations shown with dashed lines in FIG. 7 represent optional operations. FIG. 7 includes a scheduled entity 702 and a scheduling entity 704. For example, the scheduled entity 702 may correspond to the scheduled entity 500 in FIG. 5 and the scheduling entity 704 may correspond to the scheduling entity 400 in FIG. 4.

As shown in FIG. 7, the scheduled entity 702 may detect channel fading and/or channel blocking 706. As further shown in FIG. 7, the scheduled entity 702 may perform a beam refinement operation and/or may switch an antenna subarray 708. The scheduled entity 702 may transmit a message 710 that includes a reference signal scheduling request. In some aspects, the scheduled entity 702 may transmit the message 710 in response to performing operation 706 and/or 708.

The scheduling entity 704 may transmit a message 712 including an assignment of resources (e.g., time-frequency resources) in response to the reference signal scheduling request. The scheduled entity 702 may transmit a reference signal 714 (e.g., an SRS) using the assigned resources. The scheduling entity 704 may obtain channel state information 716 using the reference signal 714 and may obtain transmission parameters 718 (e.g., MCS, MIMO precoding matrix, etc.) based on the channel state information. The scheduling entity 704 may then transmit uplink (UL) data transmission scheduling information 720 (for an uplink MIMO transmission) to the scheduled entity 702 based on the transmission parameters.

In some aspects of the disclosure, the message 712 may schedule the scheduled entity 702 to transmit the reference signal 714 (e.g., an SRS) with different beams (e.g., different QCL indications). The scheduling entity 704 may then determine the beam that produces the highest receive power at the scheduling entity 704. The scheduling entity 704 may then schedule the scheduled entity 702 (e.g., via the data transmission scheduling information 720) to transmit UL data or UL control with the beam that produces the highest receive power.

In some aspects of the disclosure, the scheduling entity 704 may schedule the scheduled entity 702 to transmit the reference signal 714 (e.g., an SRS) with different antenna ports. The scheduling entity 704 may measure the reference signal 714 transmitted from the different antenna ports and may determine which antenna port (or which subset of antenna ports) provides the best UL MIMO transmission. The scheduling entity 704 may then schedule the scheduled entity 702 (e.g., via the data transmission scheduling information 720) with the identified subset of antenna ports for future UL transmissions.

Figure 8:
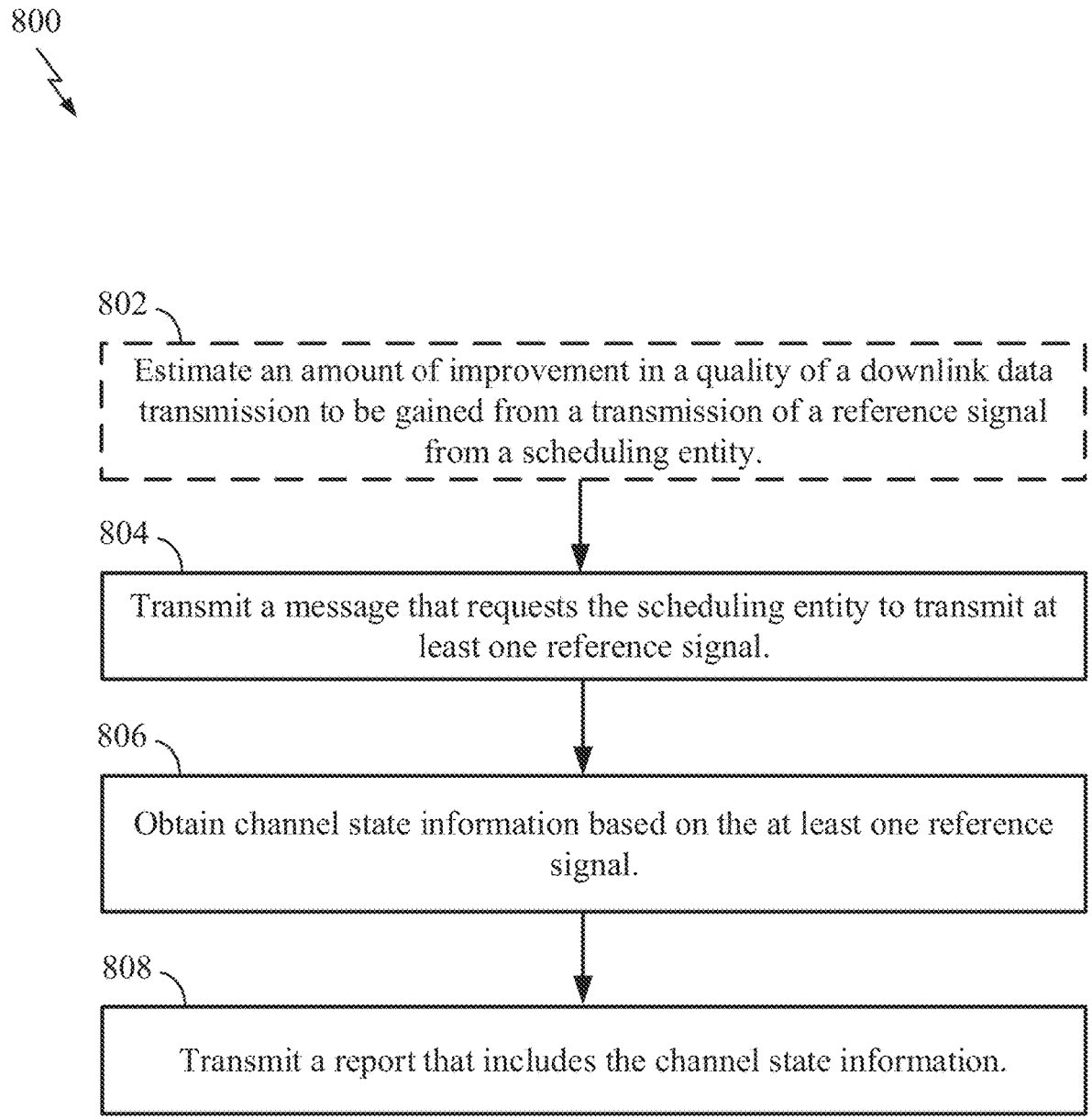
FIG. 8 is a flow chart illustrating an exemplary process according to some aspects of the disclosure.

FIG. 8 is a flow chart illustrating an exemplary process 800 in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the scheduled entity 500 illustrated in FIG. 5. In some examples, the process 800 may be carried out by any suitable apparatus or means for carrying out the functions or algorithm described below. It should be understood that the blocks indicated with dashed lines represent optional blocks.

At block 802, the scheduled entity estimates an amount of improvement in a quality of a downlink data transmission to be gained from a transmission of a reference signal.

At block 804, the scheduled entity transmits a message that requests a scheduling entity to transmit at least one reference signal. In an aspect of the disclosure, the at least one reference signal may be a CSI-RS. In an aspect of the disclosure, the scheduled entity transmits the message if the scheduled entity has refined a reception beam for at least one beam pair link, if the scheduled entity has switched a reception subarray for at least one beam pair link, or if the scheduled entity has detected a change of a channel of at least one beam pair link. In such aspect, the at least one beam pair link is configured for downlink traffic. In an aspect of the disclosure, the message includes a downlink beam report, and a request for transmission of the at least one reference signal is included in the downlink beam report. In an aspect of the disclosure, the message may include one or more spatial QCL indications. In such aspect, the at least one reference signal may be obtained using one or more reception directivity patterns, at least one of the one or more reception directivity patterns being compatible with at least one of the spatial QCL indications. In an aspect, the estimated amount of improvement is included in the message.

At block 806, the scheduled entity obtains channel state information based on the at least one reference signal. In an aspect of the disclosure, the scheduled entity may obtain the channel state information by obtaining one or more measurements for a channel using the at least one reference signal, and determining the channel state information based on the one or more measurements.

At block 808, the scheduled entity transmits a report that includes the channel state information.

Figure 9:
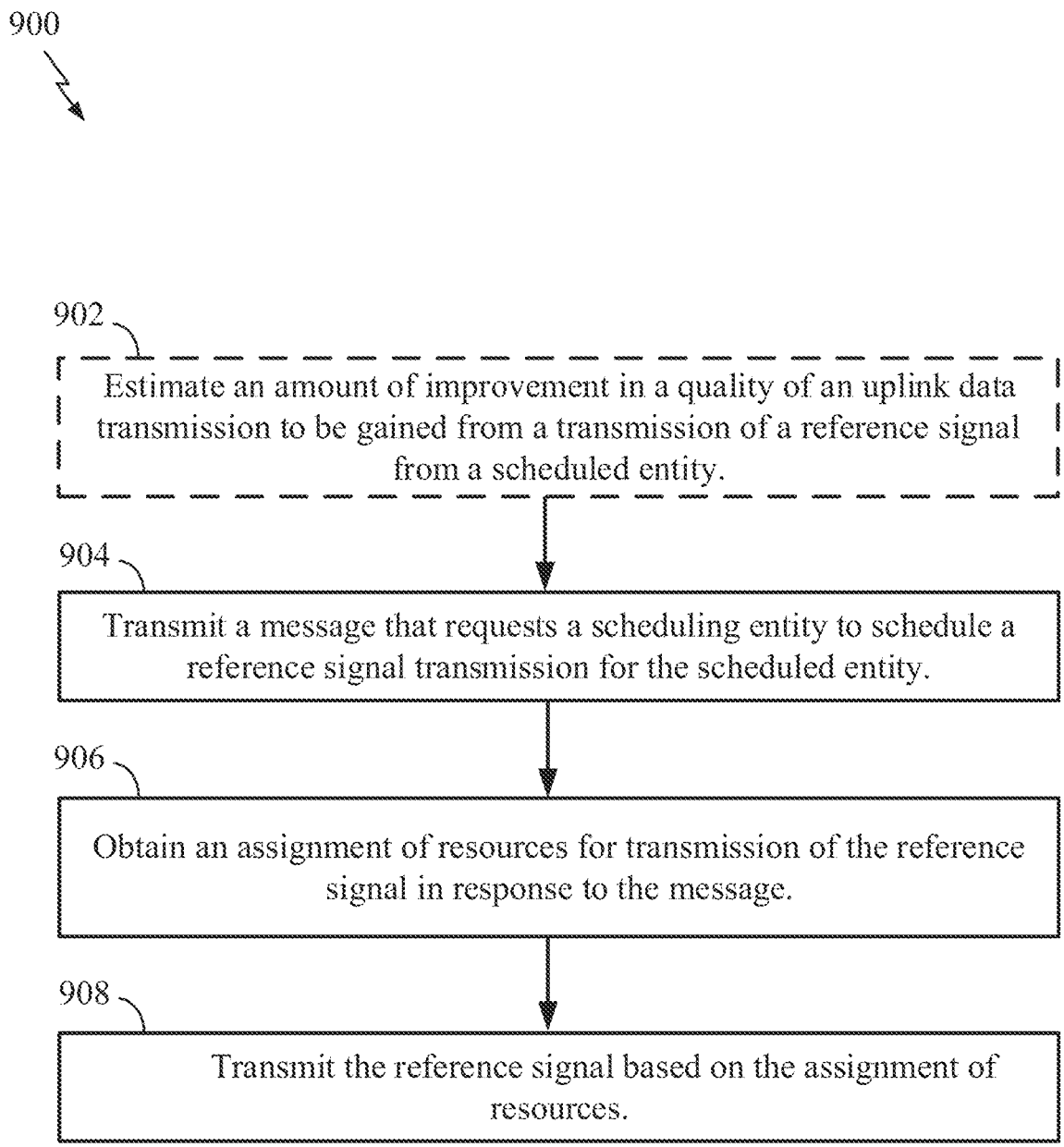
FIG. 9 is a flow chart illustrating an exemplary process according to some aspects of the disclosure.

FIG. 9 is a flow chart illustrating an exemplary process 900 in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 500 illustrated in FIG. 5. In some examples, the process 900 may be carried out by any suitable apparatus or means for carrying out the functions or algorithm described below. It should be understood that the blocks indicated with dashed lines represent optional blocks.

At block 902, the scheduled entity estimates an amount of improvement in a quality of an uplink data transmission to be gained from the transmission of a reference signal.

At block 904, the scheduled entity transmits a message that requests a scheduling entity to schedule a reference signal transmission for the scheduled entity. In an aspect of the disclosure, the at least one reference signal is an SRS. In an aspect of the disclosure, the scheduled entity transmits the message if the scheduled entity has refined a reception beam for at least one beam pair link, if the scheduled entity has switched a reception subarray for at least one beam pair link, or if the scheduled entity has detected a change of a channel of at least one beam pair link, and wherein at least one spatial QCL indication for uplink traffic refers to the at least one beam pair link. In an aspect of the disclosure, the message includes a downlink beam report, and a request for transmission of the reference signal (e.g., SRS) is included in the downlink beam report. In an aspect, the estimated amount of improvement is included in the message.

At block 906, the scheduled entity obtains an assignment of resources for transmission of the reference signal in response to the message. In an aspect of the disclosure, the assignment of resources includes at least time-frequency resources. In an aspect of the disclosure, the message includes one or more spatial QCL indications, the assignment of resources specifies at least one of the one or more spatial QCL indications, and the scheduled entity transmits the at least one reference signal using one or more transmission directivity patterns compatible with the specified at least one of the one or more spatial QCL indications.

At block 908, the scheduled entity transmits the reference signal based on the assignment of resources.

Figure 10:
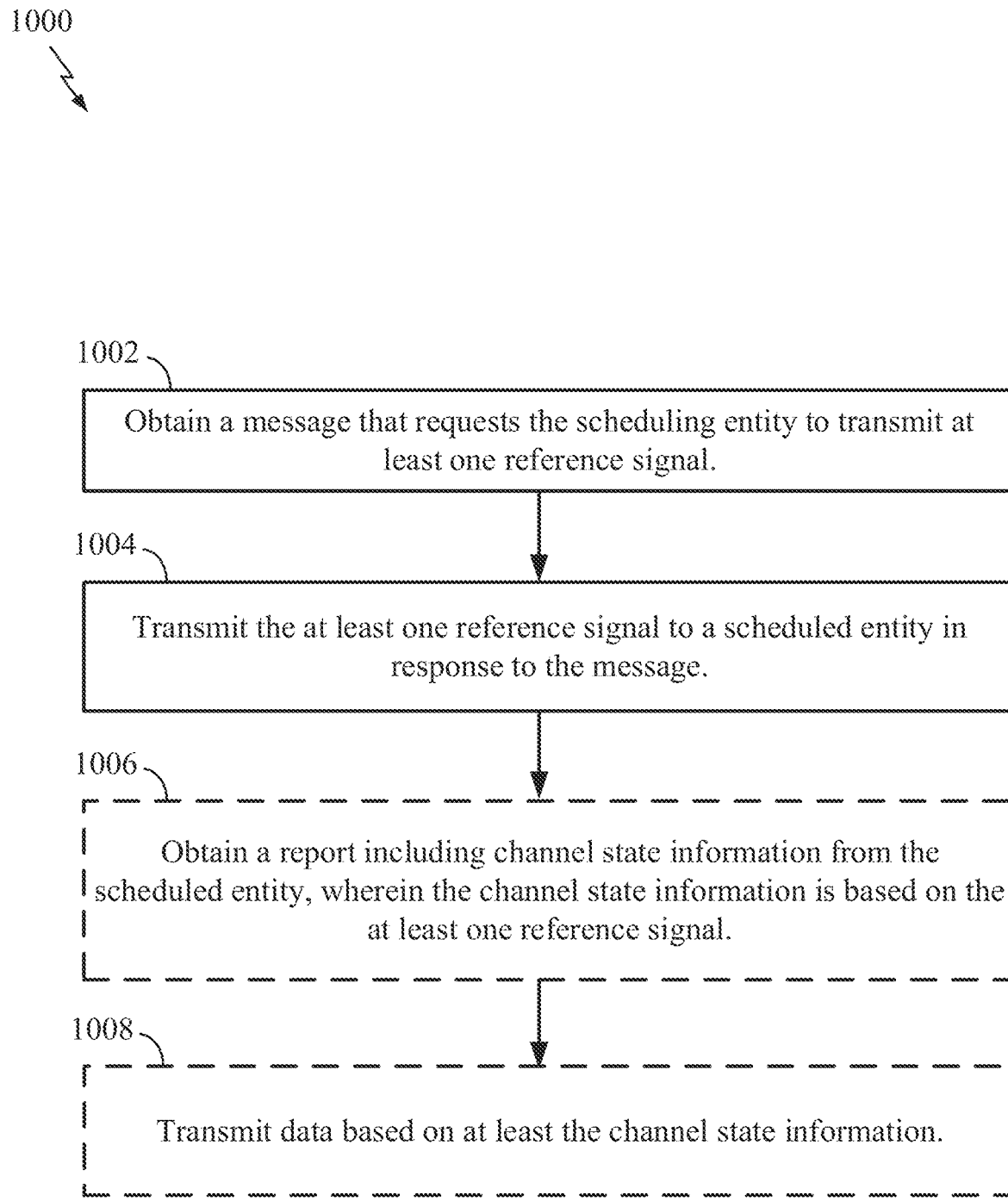
FIG. 10 is a flow chart illustrating an exemplary process according to some aspects of the disclosure.

FIG. 10 is a flow chart illustrating an exemplary process 1000 in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity 400 illustrated in FIG. 4. In some examples, the process 1000 may be carried out by any suitable apparatus or means for carrying out the functions or algorithm described below. It should be understood that the blocks indicated with dashed lines represent optional blocks.

At block 1002, the scheduling entity obtains a message that requests the scheduling entity to transmit at least one reference signal. In an aspect of the disclosure, the at least one reference signal is a CSI-RS.

At block 1004, the scheduling entity transmits the at least one reference signal to a scheduled entity in response to the message. In an aspect of the disclosure, the message includes one or more spatial QCL indications, and the scheduling entity transmits the at least one reference signal using one or more transmission directivity patterns, at least one of the one or more transmission directivity patterns being compatible with at least one of the spatial QCL indications.

At block 1006, the scheduling entity obtains a report including channel state information from the scheduled entity, where the channel state information is based on the at least one reference signal.

At block 1008, the scheduling entity transmits data based on at least the channel state information. In an aspect of the disclosure, the data is transmitted in a multiple-input multiple-output (MIMO) transmission mode using a modulation and coding scheme (MCS) that is determined using the channel state information.

Figure 11:
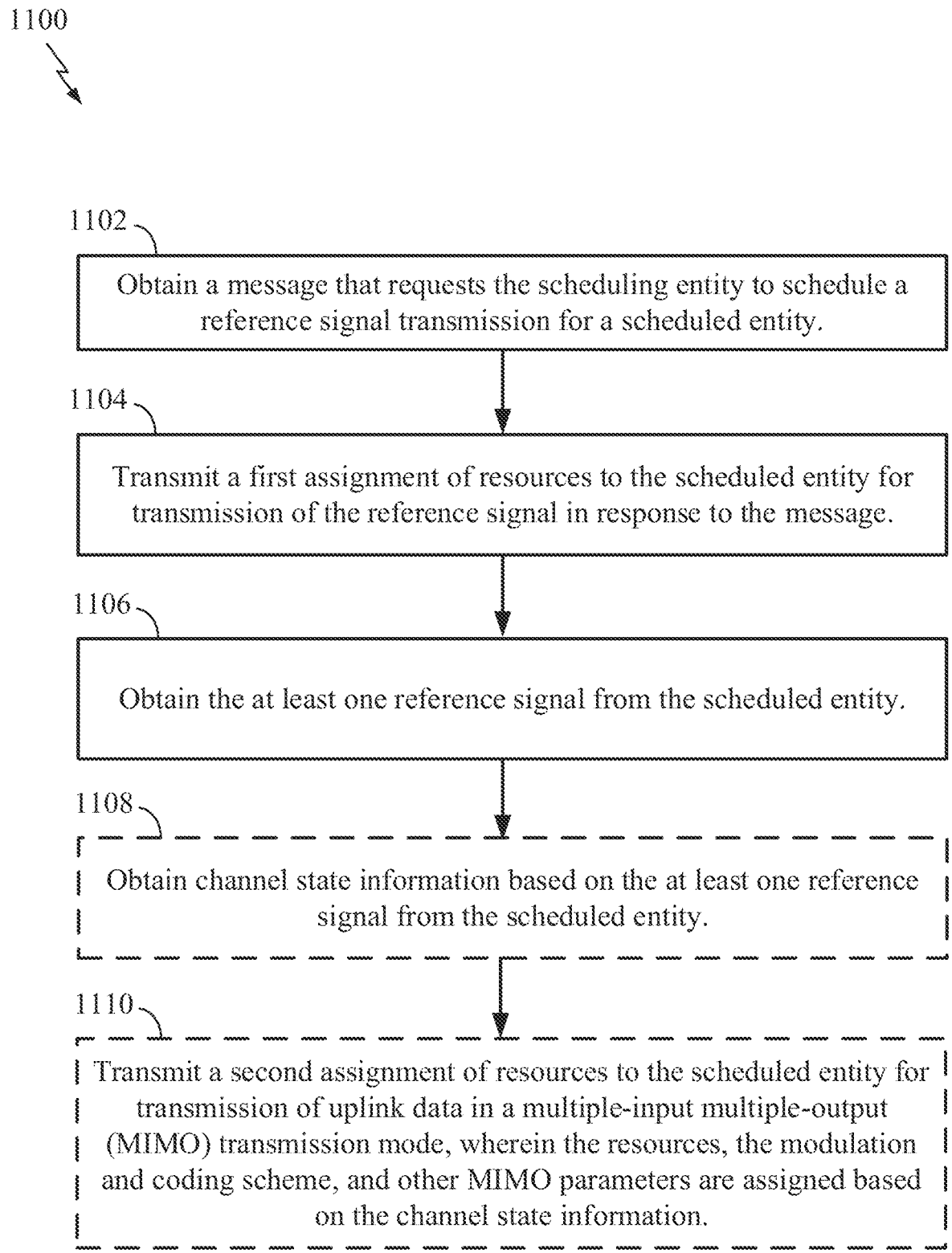
FIG. 11 is a flow chart illustrating an exemplary process according to some aspects of the disclosure.

FIG. 11 is a flow chart illustrating an exemplary process 1100 in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 400 illustrated in FIG. 4. In some examples, the process 1100 may be carried out by any suitable apparatus or means for carrying out the functions or algorithm described below. It should be understood that the blocks indicated with dashed lines represent optional blocks.

At block 1102, the scheduling entity obtains a message that requests the scheduling entity to schedule a reference signal transmission for a scheduled entity. In an aspect of the disclosure, the reference signal is a sounding reference signal (SRS).

At block 1104, the scheduling entity transmits a first assignment of resources to the scheduled entity for transmission of the reference signal in response to the message. In an aspect of the disclosure, the message includes one or more spatial QCL indications, wherein the first assignment of resources indicates that the reference signal is to be transmitted using one or more transmission directivity patterns, at least one of the one or more transmission directivity patterns being compatible with at least one of the one or more spatial QCL indications.

At block 1106, the scheduling entity obtains at least one reference signal from the scheduled entity.

At block 1108, the scheduling entity obtains channel state information based on the at least one reference signal from the scheduled entity.

At block 1110, the scheduling entity transmits a second assignment of resources to the scheduled entity for an uplink data transmission in a MIMO transmission mode, wherein the resources, the modulation and coding scheme, and other MIMO parameters are assigned based on the channel state information.

In one configuration, the apparatus 400 for wireless communication includes means for transmitting a message that requests a scheduling entity to transmit at least one reference signal, means for obtaining channel state information based on the at least one reference signal, means for transmitting a report that includes the channel state information, means for estimating an amount of improvement in a quality of an uplink data transmission to be gained from the transmission of the reference signal, wherein the estimated amount of improvement is included in the message, means for transmitting a message that requests a scheduling entity to schedule a reference signal transmission for the scheduled entity, means for obtaining an assignment of resources for transmission of the reference signal in response to the message, means for transmitting at least one reference signal based on the assignment of resources. In an aspect, the means for obtaining the channel state information based on the at least one reference signal is configured to obtain one or more measurements for a channel using the at least one reference signal, and determine the channel state information based on the one or more measurements. In one aspect, the aforementioned means may be the processor(s) 404 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1-3, 6 and/or 7, and utilizing, for example, the processes and/or algorithms described herein in relation to FIGS. 8 and/or 9.

In one configuration, the apparatus 500 for wireless communication includes means for obtaining a message that requests the scheduling entity to transmit at least one reference signal, means for transmitting the at least one reference signal to a scheduled entity in response to the message, means for obtaining a report including channel state information from the scheduled entity, wherein the channel state information is based on the at least one reference signal, means for transmitting data based on at least the channel state information, means for obtaining a message that requests the scheduling entity to schedule a reference signal transmission for a scheduled entity, means for transmitting a first assignment of resources to the scheduled entity for transmission of the reference signal in response to the message, means for obtaining the at least one reference signal from the scheduled entity, means for obtaining channel state information based on the at least one reference signal from the scheduled entity, and means for transmitting a second assignment of resources to the scheduled entity for an uplink data transmission in a multiple-input multiple-output (MIMO) transmission mode, wherein the resources are assigned based on the channel state information. In one aspect, the aforementioned means may be the processor(s) 504 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1-3, 6 and/or 7, and utilizing, for example, the processes and/or algorithms described herein in relation to FIGS. 10 and/or 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "obtaining" may include one or more actions including, but not limited to, receiving, generating, determining, or any combination thereof.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    transmitting, from a scheduled entity, a message that requests a scheduling entity to transmit at least one reference signal, the message including one or more spatial quasi co-location (QCL) indications, wherein the at least one reference signal enables measurement of a channel;
    receiving the at least one reference signal using one or more reception directivity patterns, at least one of the one or more reception directivity patterns being compatible with at least one of the one or more spatial QCL indications;
    obtaining, at the scheduled entity, channel state information based on the at least one reference signal; and
    transmitting, from the scheduled entity, a report that includes the channel state information.

2. The method of claim 1, wherein obtaining the channel state information based on the at least one reference signal comprises:
    obtaining one or more measurements for the channel using the at least one reference signal; and
    determining the channel state information based on the one or more measurements.

3. The method of claim 1, wherein the at least one reference signal is a channel state information reference signal (CSI-RS).

4. The method of claim 1, wherein the scheduled entity transmits the message if the scheduled entity has refined a reception beam for at least one beam pair link, if the scheduled entity has switched a reception subarray for at least one beam pair link, or if the scheduled entity has detected a change of the channel of at least one beam pair link, and wherein the at least one beam pair link is configured for downlink traffic.

5. The method of claim 1, further comprising:
    estimating an amount of improvement in a quality of a downlink data transmission to be gained from the transmission of the reference signal, wherein the estimated amount of improvement is included in the message.

6. The method of claim 1, wherein the message includes a downlink beam report, and wherein a request for transmission of the at least one reference signal is included in the downlink beam report.

7. An apparatus for wireless communication, comprising:
at least one processor;
a transceiver communicatively coupled to the at least one processor; and
a memory communicatively coupled to the at least one processor,
wherein the at least one processor is configured to:
- transmit a message that requests a scheduling entity to transmit at least one reference signal, the message including one or more spatial quasi co-location (QCL) indications, wherein the at least one reference signal enables measurement of a channel;
- receive the at least one reference signal using one or more reception directivity patterns, at least one of the one or more reception directivity patterns being compatible with at least one of the one or more spatial QCL indications;
- obtain channel state information based on the at least one reference signal; and
- transmit a report that includes the channel state information.

8. An apparatus for wireless communication, comprising:
means for transmitting a message that requests a scheduling entity to transmit at least one reference signal, the message including one or more spatial quasi co-location (QCL) indications, wherein the at least one reference signal enables measurement of a channel;
means for receiving the at least one reference signal using one or more reception directivity patterns, at least one of the one or more reception directivity patterns being compatible with at least one of the one or more spatial QCL indications;
means for obtaining channel state information based on the at least one reference signal; and
means for transmitting a report that includes the channel state information.

9. A non-transitory computer-readable medium storing computer-executable code, comprising code for causing a computer to:
- transmit, from a scheduled entity, a message that requests a scheduling entity to transmit at least one reference signal, the message including one or more spatial quasi co-location (QCL) indications, wherein the at least one reference signal enables measurement of a channel;
- receive the at least one reference signal using one or more reception directivity patterns, at least one of the one or more reception directivity patterns being compatible with at least one of the one or more spatial QCL indications;
- obtain, at the scheduled entity, channel state information based on the at least one reference signal; and
- transmit, from the scheduled entity, a report that includes the channel state information.

10. A method of wireless communication, comprising:
obtaining, at a scheduling entity, a message that requests the scheduling entity to transmit at least one reference signal, the message including one or more spatial quasi co-location (QCL) indications, wherein the at least one reference signal enables measurement of a channel; and
transmitting, from the scheduling entity, the at least one reference signal to a scheduled entity in response to the message, wherein the at least one reference signal is transmitted using one or more transmission directivity patterns, at least one of the one or more transmission directivity patterns being compatible with at least one of the one or more spatial QCL indications.

11. The method of claim 10, further comprising:
obtaining, at the scheduling entity, a report including channel state information from the scheduled entity, wherein the channel state information is based on the at least one reference signal; and
transmitting, from the scheduling entity, data based on at least the channel state information.

12. The method of claim 10, wherein the at least one reference signal is a channel state information reference signal (CSI-RS).

13. The method of claim 11, wherein the data is transmitted in a multiple-input multiple-output (MIMO) transmission mode using a modulation and coding scheme (MCS) that is determined using the channel state information.

14. An apparatus for wireless communication, comprising:
at least one processor;
a transceiver communicatively coupled to the at least one processor; and
a memory communicatively coupled to the at least one processor,
wherein the at least one processor is configured to:
- obtain a message that requests the scheduling entity to transmit at least one reference signal, the message including one or more spatial quasi co-location (QCL) indications, wherein the at least one reference signal enables measurement of a channel; and
- transmit the at least one reference signal to a scheduled entity in response to the message, wherein the at least one reference signal is transmitted using one or more transmission directivity patterns, at least one of the one or more transmission directivity patterns being compatible with at least one of the one or more spatial QCL indications.

15. An apparatus for wireless communication, comprising:
means for obtaining a message that requests the scheduling entity to transmit at least one reference signal, the message including one or more spatial quasi co-location (QCL) indications, wherein the at least one reference signal enables measurement of a channel; and
means for transmitting the at least one reference signal to a scheduled entity in response to the message, wherein the at least one reference signal is transmitted using one or more transmission directivity patterns, at least one of the one or more transmission directivity patterns being compatible with at least one of the one or more spatial QCL indications.

16. A non-transitory computer-readable medium storing computer-executable code, comprising code for causing a computer to:
obtain, at a scheduling entity, a message that requests the scheduling entity to transmit at least one reference signal, the message including one or more spatial quasi co-location (QCL) indications, wherein the at least one reference signal enables measurement of a channel; and
transmit, from the scheduling entity, the at least one reference signal to a scheduled entity in response to the message, wherein the at least one reference signal is transmitted using one or more transmission directivity patterns, at least one of the one or more transmission directivity patterns being compatible with at least one of the one or more spatial QCL indications.

* * * * *